Feb. 3, 1959 H. A. STAMPER 2,872,273
SCANNING TYPE CONTINUOUS RECORDING METER
Filed Nov. 3, 1952 2 Sheets-Sheet 1

INVENTOR.
H. A. STAMPER
BY
ATTORNEY

Feb. 3, 1959 H. A. STAMPER 2,872,273
SCANNING TYPE CONTINUOUS RECORDING METER
Filed Nov. 3, 1952 2 Sheets-Sheet 2
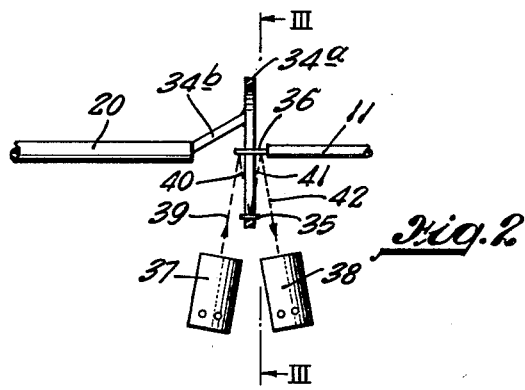
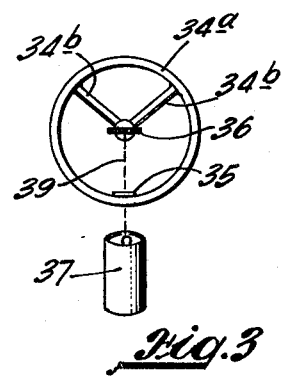
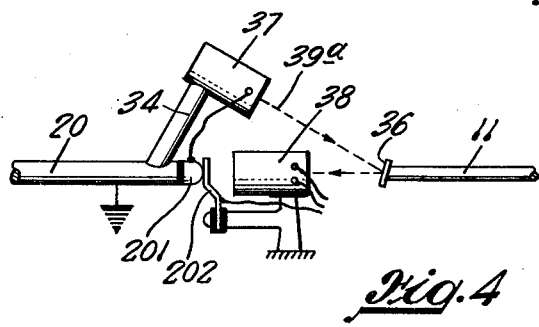
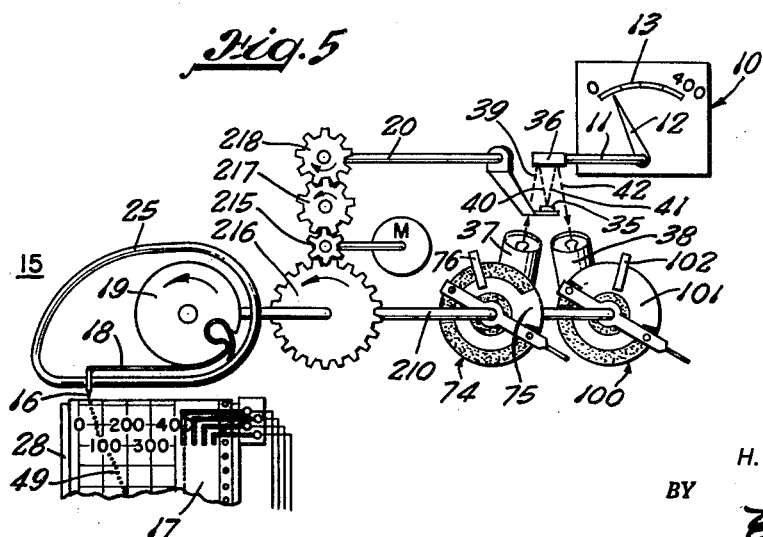
INVENTOR.
H. A. STAMPER
BY
ATTORNEY

United States Patent Office 2,872,273
Patented Feb. 3, 1959

2,872,273

SCANNING TYPE CONTINUOUS RECORDING METER

Hamilton A. Stamper, Los Angeles, Calif., assignor to Bendix Aviation Corporation, North Hollywood, Calif., a corporation of Delaware Application November 3, 1952, Serial No. 318,465

9 Claims. (Cl. 346—33)

This invention relates broadly to systems for making a time record of any reading that is capable of being shown by a meter. More specifically, it relates to a system for making a time record of the position of an oscillatable indicating element such as the shaft of a meter.

An object of the invention is to provide a simple and inexpensive recording meter.

Another object is to provide a multiple range recording meter that records a limited zone of a range of values on a scale covering the available width of the record strip and automatically shifts to the next higher or lower zone in the range of values when the reading runs off the record strip, whereby a more accurate record of a wide range of values is obtainable than if the scale of the record strip were such as to cover the entire range.

Another object is to provide a simple, and inexpensive automatic control system for maintaining a desired constancy of a variable value such as temperature, pressure, voltage, etc.

Recording meters for producing time records of temperature, voltage, current, etc. are extensively used in industry, but accurate instruments as previously constructed have been relatively expensive because they employ a pen to draw a continuous line or graph on a moving chart. Such a pen has substantial inertia and friction so that it cannot be directly actuated by a sensitive indicating meter mechanism but must be driven by a mechanism of substantial power which in turn is controlled in one way or another by a delicate sensing mechanism.

The present invention avoids the difficulties of the prior method by employing a continuously scanning electrical recorder, such as heretofore used in depth recorders and facsimile recorders, and energizing the scanning stylus momentarily during each sweep at a position on the record corresponding to the reading to be recorded. The recording position is determined by a scanning pick-up device which scans a sensitive meter in synchronism with the scanning stylus and momentarily energizes the latter in a position corresponding to the reading of the meter. The scanning pick-up device is coupled to the meter by a beam of light so that there is no load applied to the meter, and it can be sensitive but inexpensive. The record produced consists of a dotted line instead of a continuous line as in conventional recording meters, but the scanning speed can be such as to cause successive dots to merge into a continuous line.

A great advantage of the system aside from the fact that it can be much less expensive than systems of the previous type is that it lends itself readily to multi-range recording in which the total range of values that may be recorded is broken up into a plurality of sub-ranges or zones and the record strip is calibrated to cover only one zone instead of the entire range. With the system of the present invention it is a simple matter to then provide an automatic switching means to cause the recorder to shift into the next zone when the value to be recorded runs out of the previous zone. Multi-zone recording permits greater detail in the record and/or the use of a narrower record strip.

The same principle on which shifting from one zone to another is based is also applicable to provide automatic control of the value to be recorded as when the temperature of a furnace must not only be recorded but automatically maintained between certain limits.

The manner in which the foregoing objects are achieved together with various features of the invention may be understood from the following detailed description with reference to the drawing, in which:

Fig. 2 is a side elevation of the optical elements of the system of Fig. 1;

Fig. 3 is a cross section in the plane III—III of Fig. 2;

Fig. 4 is a side elevation of an alternative optical system; and

Fig. 5 is a perspective schematic diagram showing a modification of a portion of the system of Fig. 1.

Figure 1:
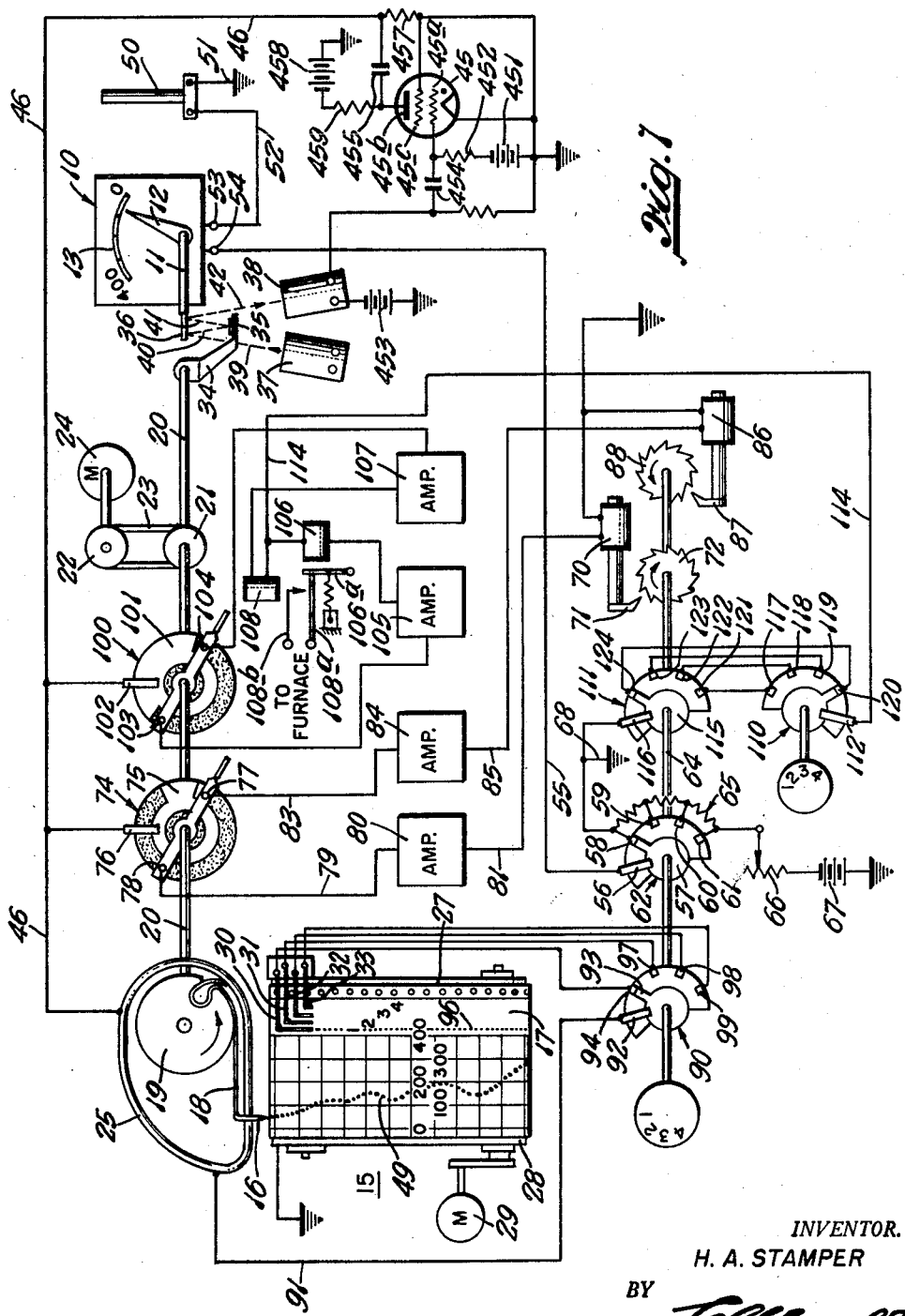
Fig. 1 is a perspective schematic diagram of a complete recording and control system in accordance with the invention.

Referring to Fig. 1, the recorder there shown includes a meter 10 of known type having a shaft 11 which may carry a pointer 12 movable over a scale 13 to give a direct reading of the angular position of the shaft 11 in terms of temperature, current, voltage or whatever is being measured. The shaft 11 will hereinafter be referred to as the master element the angular position of which is to be recorded.

The present invention resides in the combination with the master element 11 of a scanning recorder 15 for producing a permanent record, and a mechanism for energizing the recorder once during every sweep of its stylus 16 across the record sheet 17 at a point on the record sheet corresponding to the angular position at that instant of the master element 11.

The scanning recorder 15 may be any one of various types. Two examples of recorders that may be used are shown in applicant's Patent No. 2,593,068, issued April 15, 1952, entitled Stylus Structure for Recorders and in Patent No. 2,597,199, issued to H. A. Stamper, et al. on May 20, 1952, entitled Echo Distance Measuring Apparatus. The recorder 15 shown in Fig. 1 is of the type disclosed in Patent No. 2,593,068 in which the stylus 16 is constituted by one end of a resilient wire or strip 18, the other end of which is secured to a rotor 19 which is constantly rotated in counterclockwise direction by a shaft 20 which is coupled by pulleys 21 and 22 and a belt 23 to a driving motor 24. During a portion of each revolution, the rotor 19 wraps the strip 18 about itself, thereby moving the stylus 16 at uniform speed across the record sheet 17. During the remaining portion of each cycle, the one end of the strip 18 is guided by a track 25 from the trailing edge of the record sheet 17 back to the leading edge, to repeat the scanning movement. The record sheet 17 is shown as a strip which is slowly drawn over a platen roller 27 from a feed roll (not shown) onto a wind-up roll 28 which is driven by a motor 29. The recorder is also provided with four stationary stylii 30, 31, 32, and 33 respectively, one of which is energized to draw a continuous straight line on the record sheet 17 to indicate the zone of values which is being recorded. The record sheet 17 may be a paper of known type that is marked in response to an electrical discharge therethrough from any one of the stylii 16, 30, 31, 32 or 33 through the paper to the roller 27, the latter being grounded to complete the circuit.

The scanning stylus 16 is energized while at a point in its traverse across the record sheet 17 corresponding to the angular position of the master element 11 at that instant under control of a scanning pickup which includes a mirror 35 mounted on an arm 34 on the shaft 20, a mirror 36 mounted on the master element 11, a lamp 37 and a light-sensitive cell 38. The shaft 20 is positioned coxial with the master element 11.

Light emanating from the lamp 37 impinges on the mirror 36 and is reflected therefrom as a beam 40 which is angularly deflected in response to rotation of the master element 11. During rotation of the element 11 through approximately 180°, the locus of the beam 40 is a surface of revolution corresponding to a portion of the surface of a cone having its axis coincident with the axis of the element 11 and of the shaft 20. The mirror 35 is so positioned as to revolve in this locus, so that for an instant during each revolution of the mirror 35 it intercepts the beam 40, and reflects it as a beam 41 back onto the mirror 36 from which it is reflected as a beam 42 into the light-sensitive cell 38. It will be apparent therefore that for every angular position of the master element 11 and the mirror 36 within a certain angular range there will be a corresponding angular position of the shaft 20 in which the mirror 35 will intercept the beam 40 and cause its reflection into the light-sensitive cell 38. The mirror 35 is so oriented on the shaft 20, with respect to the stylus 16, that while the stylus is sweeping across the graduated area of the record sheet 17, the mirror 35 sweeps through that portion of the locus of the beam 40 corresponding to movement of the meter hand 12 across its scale. As will appear later, for any angular displacement of the element 11, the angular displacement of the mirror 35 necessary to cause it to intercept the light beam 40 will be twice as great, but this doubling of the angular movement can be taken care of by the graduation of the record sheet 17.

Impingement of the light beam 42 on the light sensitive cell 38 energizes the latter to produce a momentary voltage pulse which is amplified by a suitable amplifier tube 45 and applied over a conductor 46 to the stylus guide 25 which in turn applies it to the stylus 16 to produce a mark at a point on the record sheet 17 corresponding to the transverse position of the stylus 16 at the instant of impingement of the light beam 42 on the cell 38.

It will be seen that, in effect, the scanning system samples the reading of the meter 10 once during each cycle and makes a mark on the record sheet 17 corresponding thereto. Although a series of discontinuous marks are made on the record sheet 17 the latter may be driven (by the motor 29) at a speed sufficiently slow to cause these dots to merge into a substantially continuous line 49 if it is so desired. If the master element 11 may change its position rapidly, then in order to obtain the desired accuracy on the permanent record the scanning system should be operated rapidly. However, in many industrial applications changes of the meter reading 10 are very slow and it is not necessary to operate the scanning system at a high speed.

In practice, the meter 10 can be so chosen as to cover any desired range of values, and the record sheet 17 can be correspondingly graduated. However in many industrial applications the value to be recorded may have a relatively high value but undergo relatively slight fluctuations, in which case a scale graduated to the full scale would not give very accurate readings. Greater accuracy can be obtained in accordance with the invention by choosing the meter 10 and the scale of the record sheet 17 to cover only a portion or zone of the total range to be covered and thereby give greater accuracy. In the particular system disclosed, temperature is to be measured, and the meter 10 is a voltmeter energized from a thermocouple 50 which may be located at a remote point, as in a furnace. One terminal of the thermocouple 50 is shown connected to ground 51 and the other terminal is connected by a lead 52 to one terminal 53 of the meter 10.

The other terminal 54 of the meter 10 is shown connected to a lead 55 which is connected through a brush 56 to the common terminl 57 of a switch 62. The common terminal 57 is adapted to be rotated by a shaft 64 into any one of four positions in which it connects one of four contacts 58, 59, 60, and 61 to the lead 55. The contacts 58, 59, 60, and 61 are connected to taps on a potentiometer 65, the lower end of which is connected through a calibrating resistor 66 and through a source of potential 67 to ground, thereby completing the circuit back to the grounded terminal of the thermocouple 50. The upper end of the potentiometer to which the contact 58 is connected is also connected to ground over a lead 68.

Therefore when the shaft 64 is in the position shown, with the movable contact 57 of switch 62 on the stationary contact 58, the meter 10 is connected directly in series with the thermocouple 50 and indicates directly the voltage generated by the thermocouple. The full scale reading of the meter 10 corresponds to 400°, and with the setting shown the system will indicate and record temperatures up to 400°.

If the temperature exceeds 400° and the pointer 12 moves off the left end of scale 13, the mechanism is automatically actuated to shift the range of temperatures indicated and recorded to the range from 400° to 800°.

This shift is accomplished by rotating the shaft 64 to step the movable contact 57 of switch 62 onto the next fixed contact 59, the shifting being accomplished by a solenoid 70 having a pawl 71 which engages a ratchet wheel 72 on the shaft 64.

The solenoid 70 is energized in response to rotation of the shaft 20 into a position corresponding to off-scale position of the pointer 12, by a commutator 74 on the shaft 20. The commutator 74 has a conductive segment 75 which is permanently connected by a brush 76 to the lead 46 over which impulses are applied to the stylus 16. The conductive segment 75 of the commutator 74 periodically sweeps past and contacts two brushes 77 and 78. Brush 78 is connected by a lead 79 to the input of an amplifier 80, the output of which is connected by a lead 81 through the winding of solenoid 70 to ground. The brush 77 is connected by a lead 83 to the input of a suitable amplifier 84, the output of which is connected by a lead 85 through the winding of another solenoid 86 to ground. The solenoid 86 has a pawl 87 associated with a ratchet wheel 88 on the shaft 64 for rotating it in the opposite direction to that in which it is rotated by the solenoid 70.

The brushes 78 and 77 are so oriented, and the conductive segment 75 is so proportioned and oriented that while the stylus 16 is traversing the graduated portion of the record sheet 17, the segment 75 is moving between the brushes 78 and 77 and does not contact either one of them at the instant the stylus is energized. However when the voltage delivered by the thermocouple 50 to the meter 10 rises to a value exceeding the maximum scale reading of the meter and the maximum scale reading of the record sheet 17, then the stylus conductor 46 is energized an instant after the stylus 16 leaves the right edge of the scale on the record sheet 17 and at a time when the conductive segment 75 of commutator 74 has just begun to contact the brush 78, so that the voltage pulse is applied over the conductor 79 and through the amplifier 80 to the solenoid 70, energizing the latter to shift the shaft 64 through an angular distance such as to move the contact 57 of switch 62 out of contact with the stationary segment 58 and into contact with the stationary segment 59.

The potentiometer 65 maintains the contact 59 at a potential corresponding to 400° temperature on the meter 10. Therefore the voltage delivered by the thermocouple 50 to the terminal 53 of meter 10 is bucked by a potential corresponding to 400° applied from the potentiometer to the terminal 54. Since the meter 10 will indicate the difference between the two potentials applied to its terminals, the pointer 12 will move back to the zero mark on the scale and is then capable of registering temperatures of from 400° to 800°. It follows that the stylus 16 then begins to fire at the zero edge of the scale instead of at the 400° edge, and will now record in the 400° to 800° range or zone.

It is highly desirable in an instrument of this type that the record show positively in what range of values it is operating. It is to this end that the four stationary stylii 30, 31, 32 and 33 are provided on the recorder. In the low range position of the shaft 64, a switch 90 thereon connects the stylus track 25 over a conductor 91, a stationary brush 92, a movable contact 93 and a stationary contact 94 of the switch 90 to the stylus 30 so that it is energized simultaneously with energization of the scanning stylus 16 to draw a continuous line 96 on the record sheet 17, the position of which line indicates that the temperature is in the 0° to 400° range. The other three stylii 31, 32, and 33 are connected to contacts 97, 98, and 99 respectively of the switch 90, so that when the device is operating in a higher range the corresponding stylus is energized to draw a continuous line in a different lateral position on the record sheet 17, its position showing the higher range in which the recording is being made.

When the temperature being measured diminishes from a higher range to a lower range, the conductive contact 75 of the commutator 74 contacts the other brush 77 at the instant the stylus 16 fires ahead of the zero line on the chart 17, thereby energizing the solenoid 86 to step the shaft 64 down to the next lower zone or range.

By providing an extra commutator 100 on the shaft 20, automatic control of a furnace to maintain it within predetermined temperature limits may be had. This commutator 100 has a conductive segment 101 permanently connected by a brush 102 to the stylus lead 46 so that it receives a pulse whenever the stylus is energized. Cooperating with the segment 101 are two brushes 103 and 104 respectively. The segment 101 is of such peripheral extent and so phased that it is between brushes 103 and 104 at the instant the firing pulse occurs if the temperature is normal. However if the temperature of the furnace rises above normal value segment 101 will be in contact with the brush 103 at the time the pulse occurs. On the other hand if the temperature of the furnace drops below normal value the segment 101 will be in contact with the brush 104 at the instant the pulse occurs. The pulse on the brush 103 can be caused to reduce the temperature of the furnace and the pulse on the brush 104 can be caused to raise the temperature of the furnace. A simple method of doing this is to connect the brush 103 through an amplifier 105 to a relay coil 106 and connect the brush 104 through an amplifier 107 to a relay coil 108. Energization of coil 108 pulls an armature 108a into contact with a contact 108b to complete a circuit to the furnace control system that will increase the temperature. The armature 108a is locked against the contact 108b by an armature 106a associated with the relay winding 106 thereby preventing return of the armature 108a. When the relay winding 106 is energized, the armature 106a is pulled out from under the armature 108a permitting it to fall away from the contact 108b and open the circuit causing the increase of furnace temperature.

The arcuate extent of the commutator segment 101 determines the variation from normal temperature required to actuate the relays 106 and 108, and the actual temperature within any one of the four 400° ranges can be regulated within fine limits by rotary adjustment of the brushes 103 and 104.

To select the range in which the automatic control is to function, a manual switch 110 and a cooperating switch 111 actuated by the shaft 64 are provided. Switch 110 has a movable contact connected through a brush 112 to the common return lead 114 of the relays 106 and 108, and switch 111 has a movable contact 115 connected through a brush 116 to the ground lead 68. Switch 110 has four fixed contacts 117, 118, 119 and 120, respectively, connected to four fixed contacts 121, 122, 123, and 124 of switch 111. It will be apparent that by setting the manual switch 110 for the range in which automatic control is to be effected, the operating circuits for the control relays 106 and 108 will be opened by switch 111 in the other three ranges, and there can be no false operation of the relays in those ranges.

The amplifier 45 is preferably of such design as to produce a single short pulse in response to the initiation of the voltage pulse in the photocell 38, so that the pulse applied to the stylus 16 is only momentary and produces only a dot on the record sheet 17 irrespective of the duration of the period of energization of the photocell 38 by the light beam 42. This eliminates any necessity for using a narrow or sharply focused light beam and a small aperture in the photocell. In the circuit shown, the tube 45 is a thyratron in which a grid biasing battery 451 applies a negative potential through a resistor 452 to the grid 45a of tube 45, the negative potential being sufficient to block the tube. When the photocell 38 is energized by the beam of light, it becomes conductive and applies a positive pulse from a battery 453 through a condenser 454 to the control grid of the tube 45, rendering the latter conductive and suddenly discharging a condenser 455 connected between the anode 45b and cathode 45c through a resistor 457. The resultant voltage momentarily developed across resistor 457 is applied to the stylus lead 46. Condenser 455 is recharged from a potential source 458 through a resistor 459, which is so high as to extinguish the current in tube 45 after discharge therethrough of the condenser 455.

As best shown in Figs. 2 and 3, the plane of the mirror 36 on the master shaft should contain the axis of rotation, in order that the locus of the beam 40 be a conical surface symmetrical with respect to the axis of rotation of the master element. The lamp 37 and photocell 38 should have their optical axes in a common plane containing the axis of rotation of the shafts 11 and 20, and the mirror 35 should be normal to an axial plane of the shafts 11 and 20 so that the beam 41 impinges on the mirror 36 at its axis. It is desirable, although not essential, to symmetrically position the lamp and photocell on opposite sides of the plane of rotation of the mirror 35, and have this plane intersect the longitudinal midpoint of the mirror 36. This is made possible by supporting the mirror 35 on a ring 34a connected to the shaft 20 by one or more spokes 34b (Fig. 3) so oriented as not to interfere with the light beams during the recording portion of the cycle. In this connection, it is to be remembered that the recording arc of mirror 35 is twice that of mirror 36 and the meter shaft 11, which latter arc itself may be in excess of 100°.

Fig. 4 shows an alternative optical system in which the active arc of shaft 20 is the same as that of shaft 11. In this arrangement the lamp 37 is mounted on the arm 34, the photocell is stationarily mounted between the shafts 20 and 11 and coaxial therewith so that the locus of the beam 39a from the lamp is a conical surface having its apex in the center of the mirror 36 and the mirror 36 is so angularly directed with respect to the axis of the shaft 11 that in corresponding positions of the shafts 20 and 11, the beam 39a is reflected into the photocell.

The system of Fig. 4 has the advantage of reducing the active arc of the shaft 20 (and the recorder 15) but may be less desirable for design because of the size of the lamp and photocell and the necessity of energizing the lamp through moving contacts, such as an insulated contact 201 on the shaft 20 and a stationary brush 202.

A mechanical way of reducing the active angle of the recording shaft is shown in Fig. 5. Here the stylus of recorder 15, and commutators 74 and 100 are mounted on a shaft 210 separate from the shaft 20 which carries the revolving mirror 35 and is coaxial with the master shaft 11 of the meter which carries the mirror 36. The optical system associated with the mirrors 35 and 36 is identical with that of Fig. 1. The shaft 20 is parallel to and spaced above the shaft 210 and the two shafts are driven in opposite directions at different speeds by a motor-driven spur gear 215 meshing with a gear 216 on the shaft 210, and meshing with an idler gear 217 which in turn meshes with a gear 218 on the shaft 20. By making gear 216 twice the diameter of gear 218, the recording arc of the stylus shaft 210 can be made equal to that of the master shaft 11. The double speed of shaft 20 will fire the stylus twice in each cycle, at 180° intervals, but at one firing the stylus will be off the record sheet so no error will be introduced.

In Figs. 1 and 4 the meter 10 reads from right to left whereas the record reads from left to right. In many applications this is not objectionable, but the idler gear 217 is introduced in Fig. 5 to reverse the direction of shaft 20 and cause both the meter and the record to read in the same direction.

Although for the purpose of explaining the invention, a particular embodiment thereof has been shown and described, obvious modifications will occur to a person skilled in the art, and I do not desire to be limited to the exact details shown and described.

I claim:

1. Apparatus of the type described comprising: a scanning means movable through a plurality of positions corresponding to predetermined different values; indicating means energizable to indicate a value corresponding to the position of said scanning means at the time of energization; a master element movable about an axis of rotation through a plurality of positions related to said predetermined different values; a scanning pickup element and means supporting it for rotation coaxial with, but independently of, said master element; means for periodically moving said scanning means through said positions corresponding to predetermined different values; means coupling said pickup element to said scanning means for movement in phase therewith such that during successive scanning trips of said scanning means through said plurality of positions said pickup element rotates through the same predetermined arc; means including cooperating members on said master element and said pickup element responsive to any angular position of said master element within said plurality of positions for momentarily energizing said indicating means at the instant of movement of said pickup element through a corresponding angular position; said means for momentarily energizing said indicating means comprising: means for producing and directing a beam of light along a first path intersecting the axis of rotation of said master element, a first mirror on said master element in the said first path for reflecting said beam into a second path the locus of which in response to rotation of said master element through its arc is a surface of revolution about said axis of rotation, a second mirror on said scanning pickup element radially displaced from said axis and in said locus of said second path for intercepting said beam at the instant of movement of said pickup element through said corresponding position and reflecting it through a third path back to said first mirror for reflection into a fixed fourth path, a light-responsive cell in said fourth path responsive to said beam to produce an electric pulse, and means for energizing said scanning means in response to said electric pulse.

2. Apparatus according to claim 1 in which said light-producing and directing means and said light-responsive means are in an axial plane of said axis of rotation.

3. Apparatus according to claim 2 in which said first mirror is in said axis of rotation, said second mirror is normal to a radius from said axis of rotation and said light-producing means and said light-responsive cell are symmetrically positioned axially on opposite sides of the plane normal to said axis containing said first and second mirrors.

4. In a recorder for recording the angular position of a master element within a predetermined arc about an axis of rotation; a record element and means for constantly moving it in a record path; a scanning stylus movable across said record element in a stylus path transverse to said record path and adapted when momentarily energized to mark its position on said record element; a scanning pickup element and means supporting it for rotation coaxially with but independently of said master element; means for periodically moving said scanning stylus through said stylus path; means coupling said pickup element to said stylus for movement in phase therewith such that during successive scanning trips of said stylus across said record element said pickup element rotates through the same predetermined arc; means including cooperating members on said master element and said pickup element responsive to any angular position of said master element within its said predetermined arc for momentarily energizing said stylus at the instant of movement of said pickup element through a corresponding angular position in its said predetermined arc; said master element constituting the movable element of a D. C. electric meter having a potential range corresponding to said predetermined arc of movement of the master element and said record element having lower and upper recorder limits corresponding to said potential range; a pair of terminals adapted to have applied thereto potentials of fixed polarity to be recorded; a source of calibrated potential of value equal to said potential range of said meter; means including a switch movable between two positions for selectively connecting said terminals directly to said meter in one position and connecting said source and terminals in series to said meter with said source reversed in polarity with respect to said meter in the other position; first electrical actuating means for shifting said switch into said other position to connect said source and terminals in series with said meter; second electrical actuating means for shifting said switch into said one position to connect said terminals directly to said meter; and means including master switch means actuated by said stylus-moving means in timed relation thereto for connecting said stylus to said first actuating means as the stylus crosses the upper recording limit of said record means and connecting said stylus to said second actuating means as the stylus crosses the lower recording limit of said record means; whereby energization of said stylus during movement thereof beyond either recording limit of said record means energizes one of said actuating means to vary the potential applied to said meter in direction to shift the point of recording to the other recording limit of the record element.

5. A recorder according to claim 4 including a pair of stationary stylii in recording relation with said record sheet at laterally separated points thereon and means actuated by said switch for energizing different ones of said stationary stylii in different positions of said switch.

6. Apparatus of the type described comprising: a scanning means movable through a plurality of positions corresponding to predetermined different values; indicating means energizable to indicate a value corresponding to the position of said scanning means at the time of energization; a master element movable about an axis of rotation through a plurality of positions related to said predetermined different values; a scanning pickup element and means supporting it for rotation coaxial with, but independently of, said master element; means for periodically moving said scanning means through said positions corresponding to predetermined different values; means coupling said pickup element to said scanning means for movement in phase therewith such that during successive scanning trips of said scanning means through said plurality of positions said pickup element rotates through the same predetermined arc; means including cooperating members on said master element and said pickup element responsive to any angular position of said master element within said plurality of positions for momentarily energizing said indicating means at the instant of movement of said pickup element through a corresponding angular position; said means for momentarily energizing said scanning means comprising a lamp device and a cooperating light-responsive device each having an optical axis and means responsive to illumination of said light-responsive device by said lamp device for energizing said scanning means; means mounting one of said devices on said scanning pickup element in eccentric relation to said axis of rotation with its optical axis intersecting said master element; means stationarily mounting the other said device between said master element and said pickup element with its optical axis coaxial with and directed toward said master element; and a mirror on said master element at the intersection of the optical axes of said devices, said mirror being so inclined that the angle between its normal axis and said master element axis is half the angle between the optical axis of said one device and said master element axis.

7. Apparatus of the type described comprising: a scanning means movable through a plurality of positions corresponding to predetermined different values; indicating means energizable to indicate a value corresponding to the position of said scanning means at the time of the energization; a master element movable about an axis of rotation through a plurality of positions related to said predetermined different values; a scanning pickup element and means supporting it for rotation coaxial with, but independently of, said master element; means for periodically moving said scanning means through said positions corresponding to predetermined different values; means coupling said pickup element to said scanning means for movement in phase therewith such that during successive scanning trips of said scanning means through said plurality of positions said pickup element rotates through the same predetermined arc; means including cooperating members on said master element and said pickup element responsive to any angular position of said master element within said plurality of positions for momentarily energizing said indicating means at the instant of movement of said pickup element through a corresponding angular position; said means for momentarily energizing said scanning means comprising means for producing and directing a beam of light along a first path intersecting the axis of rotation of said master element; a first mirror on said master element in the said first path for reflecting said beam into a second path the locus of which in response to rotation of said master element through its arc is a surface of revolution about said axis of rotation; a second mirror on said scanning pickup element radially displaced from said axis and in said locus of said second path for intercepting said beam at the instant of movement of said pickup element through said corresponding position and reflecting it through a third path back to said first mirror for reflection into a fixed fourth path; and a light-responsive cell in said fourth path responsive to said beam to produce an electric pulse and means for energizing said scanning means in response to said electric pulse; said means for periodically moving said scanning means comprising a rotatable element; and mechanical coupling means coupling said scanning means to said rotatable element for rotation of the scanning means at half the speed of the scanning pickup element.

8. In a recorder for recording the angular position of a master element within a predetermined arc about an axis of rotation; a record element and means for constantly moving it in a record path; a scanning stylus movable across said record element in a stylus path transverse to said record path and adapted when momentarily energized to mark its position on said record element; a scanning pickup element and means supporting it for rotation coaxially with but independently of said master element; means for periodically moving said scanning stylus through said stylus path; means coupling said pickup element to said stylus for movement in phase therewith such that during successive scanning trips of said stylus across said record element said pickup element rotates through the same predetermined arc; means including cooperating members on said master element and said pickup element responsive to any angular position of said master element within its said predetermined arc for momentarily energizing said stylus at the instant of movement of said pickup element through a corresponding angular position in its said predetermined arc; rotary switching means having a first contact connected to said stylus; a second contact; means connected to said second contact responsive to a potential pulse for actuating a control; means for periodically closing said first and second contacts in phase with the movement of said stylus through a predetermined position in its path, whereby energization of said stylus while in said predetermined position actuates said control.

9. A recorder according to claim 8 including a third contact and means connected to it responsive to a potential pulse for actuating a second control; and means for periodically closing said first and third contacts in phase with the movement of said stylus through a second predetermined position different from said first mentioned predetermined position whereby energization of said stylus while in said second predetermined position actuates said second control.

References Cited in the file of this patent

UNITED STATES PATENTS

| 974,562 | Foote | Nov. 1, 1910 |
| 2,367,614 | Rich | Jan. 16, 1945 |
| 2,403,983 | Koenig | July 16, 1946 |
| 2,434,531 | Wilson | Jan. 13, 1948 |
| 2,637,619 | Stein | May 5, 1953 |

FOREIGN PATENTS

| 91,635 | Sweden | Dec. 29, 1937 |
| 723,774 | Germany | Aug. 10, 1942 |